United States Patent [19]
Eskeli

[11] 3,961,485
[45] June 8, 1976

[54] TURBINE WITH HEAT INTENSIFIER

[76] Inventor: Michael Eskeli, 7994-41 Locke Lane, Houston, Tex. 77042

[22] Filed: June 16, 1975

[21] Appl. No.: 587,408

Related U.S. Application Data

[63] Continuation-in-part of Ser. No. 413,258, Nov. 6, 1973, Pat. No. 3,889,471, and a continuation-in-part of Ser. No. 474,729, May 30, 1974.

[52] U.S. Cl. .................................. 60/655; 60/682; 415/66; 415/68
[51] Int. Cl.[2] ........................................ F01K 23/08
[58] Field of Search ............ 60/643, 645, 650, 682, 60/655, 721; 415/66, 68

[56] References Cited
UNITED STATES PATENTS

| | | | |
|---|---|---|---|
| 3,834,179 | 9/1974 | Eskeli | 60/682 X |
| 3,889,471 | 6/1975 | Eskeli | 60/682 X |
| 3,895,491 | 8/1975 | Eskeli | 60/682 X |

Primary Examiner—Allen M. Ostrager

[57] ABSTRACT

A method and apparatus for generation of power wherein a first fluid is compressed and accelerated within radially oriented rotor passages with accompanying temperature increase during said compression, wherein heat is transferred into a second fluid also being accelerated but which has a lesser temperature increase, and wherein both fluids are then decelerated and expanded with release of work. Two rotors are used, with said second fluid being expanded either partially or fully within the second rotor. Suitable heat exchangers are provided within the rotors for adding heat into said first fluid and removing heat from said second fluid; also, a cooling heat exchanger may be provided within the passages for said first fluid. The heat transfer from first fluid to second fluid occurs in areas near the rotor periphery, and the cooling and heat addition heat exchangers are located generally inward toward rotor center from said heat exchangers near said rotor periphery.

4 Claims, 2 Drawing Figures

TURBINE WITH HEAT INTENSIFIER

CROSS REFERENCES TO RELATED APPLICATIONS

This application is a continuation-in-part application of "Dual Rotor Dual Fluid Turbine", Ser. No. 413,258, filed 11/6/73, now U.S. Pat. No. 3,889,471 and "Rotary Heat Exchanger with Cooling", Ser. No. 474,729, filed 5/30/74.

BACKGROUND OF THE INVENTION

This invention relates generally to turbines for generating power wherein a fluid is passed through a turbine.

There have been various types of turbines known previously, and in some of these, a working fluid is accelerated in stationary nozzles and then said fluid is passed inward toward rotor center generating power by reaction in such rotor. These conventional turbines require normally a pressurized fluid from a suitable source for their operation.

SUMMARY OF THE INVENTION

It is the object of this invention to provide a power turbine combined with a heat intensifier wherein heat is converted to power directly. This turbine also provides a means wherein relatively low temperature heat can be used to generate power, this being made possible by the use of said heat intensifier portion together with a turbine portion, with the temperature of available heat being increased within said heat intensifier portion, with power being generated within said turbine portion, using heat delivered from said heat intensifier.

DESCRIPTION OF PREFERRED EMBODIMENTS

Figure 1:
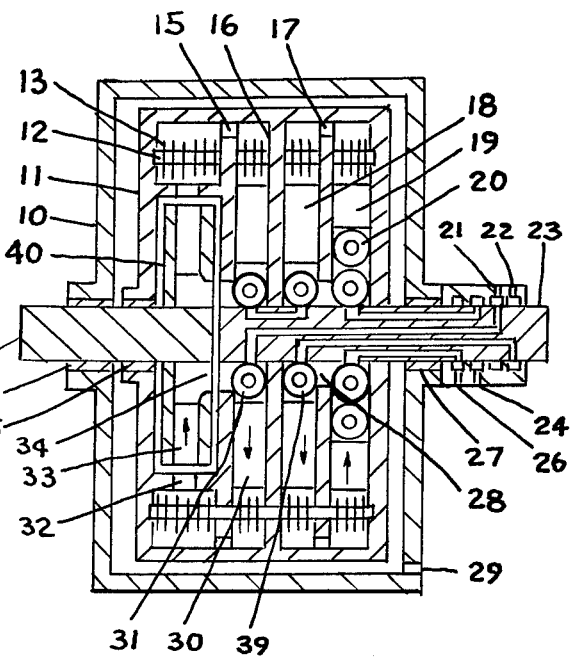
FIG. 1 is an axial cross section of the turbine.

Referring to FIG. 1, therein is shown a cross section of the turbine. 10 is casing supporting bearings 36 and 27, and shafts 37 and 23. 11 is first rotor, 12 and 13 form a heat exchanger for transferring heat from the heat intensifier portion to the turbine portion, said heat exchanger being the high temperature heat exchanger which may be formed by heat pipes 12 and fins 13, 15 are openings, 16 is wall between heat intensifier portion and turbine portion, 17 are openings, 18, 19, 30 and 33 are vanes, 20 is heat addition heat exchanger for the heat intensifier portion, 21 and 22 are coolant entry and exit, 24 and 26 are heating fluid entry and exit, 28 and 34 are fluid passages, 39 is cooling heat exchanger for heat intensifier portion, 31 is heat exchanger for turbine portion cooling, 32 are second fluid nozzles, discharging forward in the direction of rotation into the second rotor 40.

In operation, the cavities of the rotors are filled with a first fluid within the heat intensifier space and a second fluid within the turbine space. The first rotor is caused to rotate, and the first fluid is compressed by centrifugal force when moving outward toward rotor periphery within spaces defined by vanes 18, said compression being accompanied by a temperature increase. Heat is transferred from said first fluid into high temperature heat exchanger near the rotor periphery, and then said first fluid is passed through openings 17 and inward through passages defined by vanes 19. After expansion and during latter part of expansion, heat is added into the first fluid in heat exchanger 20, and the first fluid passes then through opening 28 and through cooling coil 39, to be again compressed thus completing its work cycle.

Within the turbine side, the second fluid circulates through the first and second rotor passages. Second fluid is compressed and accelerated in outward extending passages defined by vanes 30 and heat is added into the second fluid in the high temperature heat exchanger near the periphery, and then the second fluid passes through openings 15 and then through nozzles 32 being discharged forward, into second rotor inward passages defined by vanes 33. After deceleration within the second rotor 40, the second fluid passes into first rotor cooling heat exchanger 31 via openings 34, to be again accelerated thus completing its work cycle.

Figure 2:
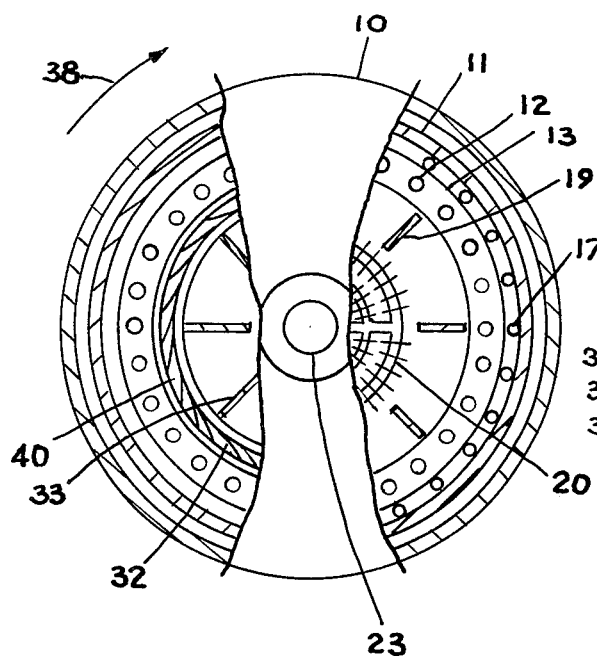
FIG. 2 is an end view of the unit.

In the FIG. 2, end view of the turbine is shown with portions removed to show internal details. 10 is casing, 11 is first rotor, 12 and 13 are heat pipes and fins for the high temperature heat exchanger, 19 are vanes, 17 are openings for first fluid, 20 is heat addition heat exchanger, 23 is a shaft for first rotor, 32 are nozzles for second fluid, 33 are vanes, 40 is second rotor, 15 are second fluid openings, and 38 indicates the direction of rotation for both rotors.

The first fluid and the second fluid are selected so that the temperature increase during the compression is greater for the first fluid, thus providing for the needed temperature differential required for heat transfer from first fluid to second fluid.

The first fluid is provided with a cooling heat exchanger near the first rotor center, as indicated, using heat exchanger 39. This cooling is provided mainly to increase the density of the first fluid in passages defined by vanes 18; such density increase will assist in the circulation of said first fluid within rotor.

The high temperature heat exchanger is shown to be made of heat pipes and fins. Other forms of heat exchangers may be used to transfer heat from said first fluid into said second fluid. Similarly, various types of heat exchangers may be used for adding heat into the fist fluid, and removing heat from the first and second fluids.

In FIG. 1, it is shown that the same cooling fluid is being used for cooling both first fluid and second fluid; separate fluids may be used, if desired, with separate supply to each heat exchanger from outside rotor.

The heat addition fluid and the cooling fluid may be liquids or gases, as desired.

The rotors are shown to be mounted within a casing with a vent 29 which can be used to evacuate the said casing. The rotors may also be mounted on open supports, if desired.

Normally, the second rotor is contained within the first rotor with bearing and seal 35 being provided to seal second fluid within the rotors. Obviously, in a different arrangement, the second rotor could be extented to contain first rotor, if desired. Such changes do not change the spirit of the invention. Also, various controls may be added to the turbine, as desired.

The locations of the several heat exchangers may be varied to suit the operating requirements of the first and second fluids being used. Generally, the high temperature heat exchanger is located near the rotor periphery for best efficiency, and the heat addition heat exchanger is located nearer to rotor center from said high temperature heat exchanger. The cooling heat exchanger in the heat intensifier portion is usually near the center or may extend into the outward extending passage to provide cooling during early part of compression. The cooling heat exchanger for the turbine portion may be located as desired generally inward from the said high temperature heat exchanger. The sizes of these heat exchangers are determined conventionally. The cooling heat exchanger for the heat intensifier portion may be deleted if desired if the temperatures of the other fluids permit, and the internal details of the vanes, and openings permit. It should be noted in this connection that the lengths of the vanes radially may also be varied with longer vanes usually on the compression side of the heat intensifier portion or the turbine portion; further, the vanes may be curved in conventional manner thus improving the fluid circulation within the rotors.

It should be noted that the high temperature heat exchanger can be made of finned turbing similar to the construction of the heat addition heat exchanger, and the heat transfer from the heat intensifier portion into the turbine portion be carried by circulating heat transfer fluid. In such arrangements, the actual heat addition into the second fluid can then be carried out within heat exchanger coils placed within the second rotor passages, such heat addition also may be done in both first and second rotors. Theoretically, such changes in the locations of heat exchangers do not change the basic principles of operation of this turbine. The form shown in FIG. 1, is believed to be the easiest and economically best construction, and for that reason, only the form shown in FIG. 1 was illustrated.

It also should be noted that the cooling heat exchanger can be placed within the said second rotor if desired.

What I claim is:

1. A turbine for generating power comprising:
   a. a first shaft and a second shaft rotatably supported in bearings;
   b. a first rotor supported for rotation by said first shaft;
   c. a second rotor supported for rotation by said second shaft;
   d. said first rotor comprising:
      i. an inward extending first fluid passage and an inward extending first fluid passage, a fist passage means connecting the outward ends of aid outward extending first fluid passage and said inward extending first fluid passage and a second passage means for connecting the inner ends of said outward extending first fluid passage and said inward extending first fluid passage, a first fluid circulating in said passages, being compressed by centrifugal force by said first rotor with accompanying temperature increase;
      ii. an outward extending second fluid passage connected at its outward end with an opening for a second fluid with said second fluid being passed into nozzles oriented to discharge said second fluid forwardly in the direction of rotation;
      iii. a high temperature heat exchanger being carried by said first rotor and providing heat removal for said first fluid and providing heat addition for said second fluid with said high temperature heat exchanger being at least in part near the periphery of said first rotor;
      iiii. a heat addition heat exchanger for adding heat into said first fluid and being carried by said first rotor;
   e. said second rotor comprising an inward extending second fluid passage with the outer ends of said inward extending passages being downstream adjacent to said first rotor nozzles and the inner ends of said inward extending second fluid passages communicating with the inner ends of said outward extending second fluid passages of said first rotor.

2. The turbine of claim 1 wherein a second cooling heat exchanger is provided within the turbine portion of said rotors for removal of heat from said second fluid.

3. The turbine of claim 1 wherein a first cooling heat exchanger is being provided within the heat intensifier portion for removal of heat from said first fluid; with said first cooling heat exchanger being inward nearer the rotor center than said high temperature heat exchanger.

4. The turbine of claim 1 wherein said high temperature heat exchanger is divided into two high temperature heat exchangers with a heat transfer fluid being circulated therein, and with one section of said high temperature heat exchanger being within the turbine portion, and another section of said high temperature heat exchanger being within the heat intensifier portion of said rotors.

* * * * *